July 4, 1933.  T. R. HARRISON  1,916,420
CONTROL APPARATUS
Filed Nov. 2, 1929  2 Sheets-Sheet 1
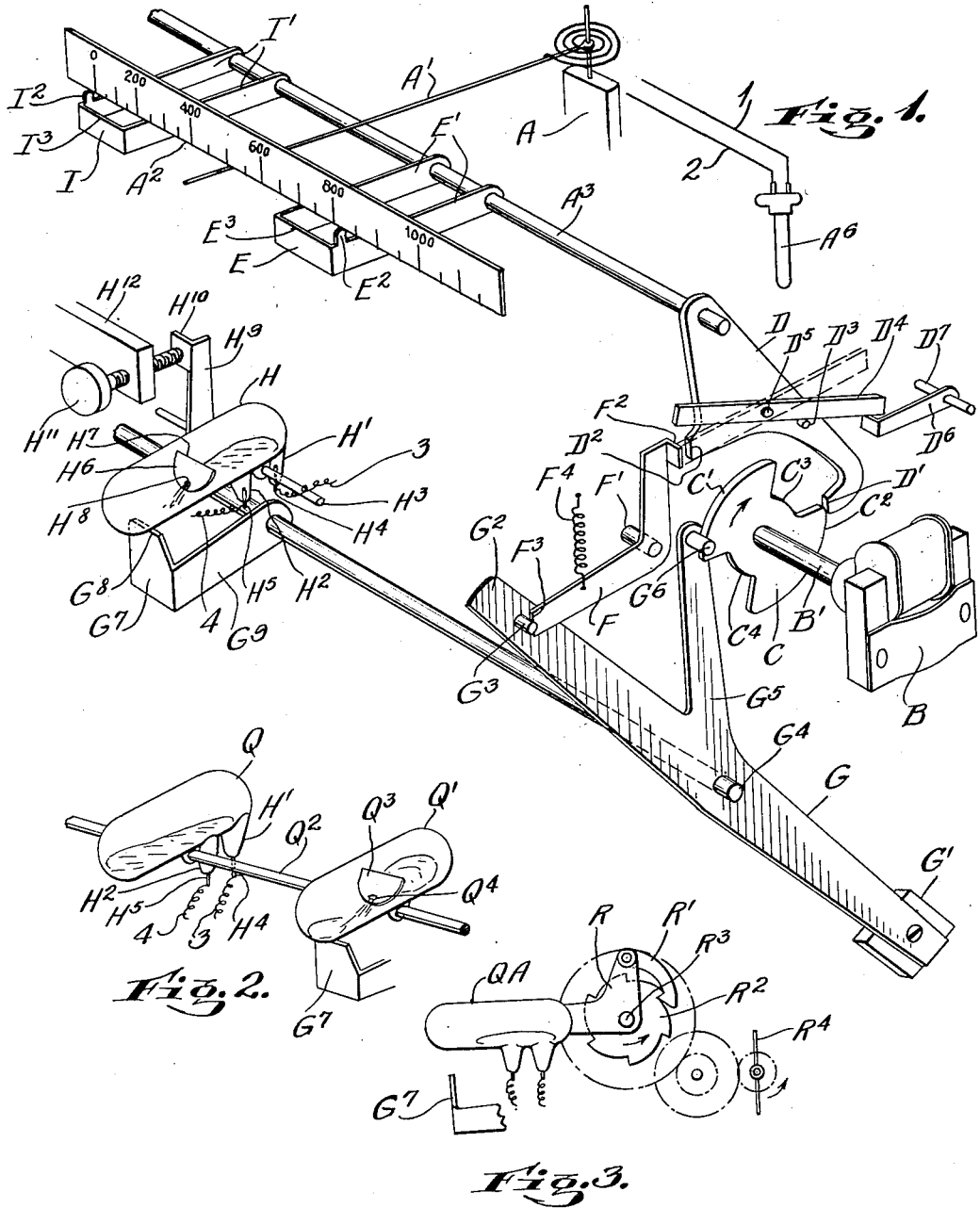
INVENTOR.
THOMAS R. HARRISON
BY John E. Hubbell
ATTORNEY

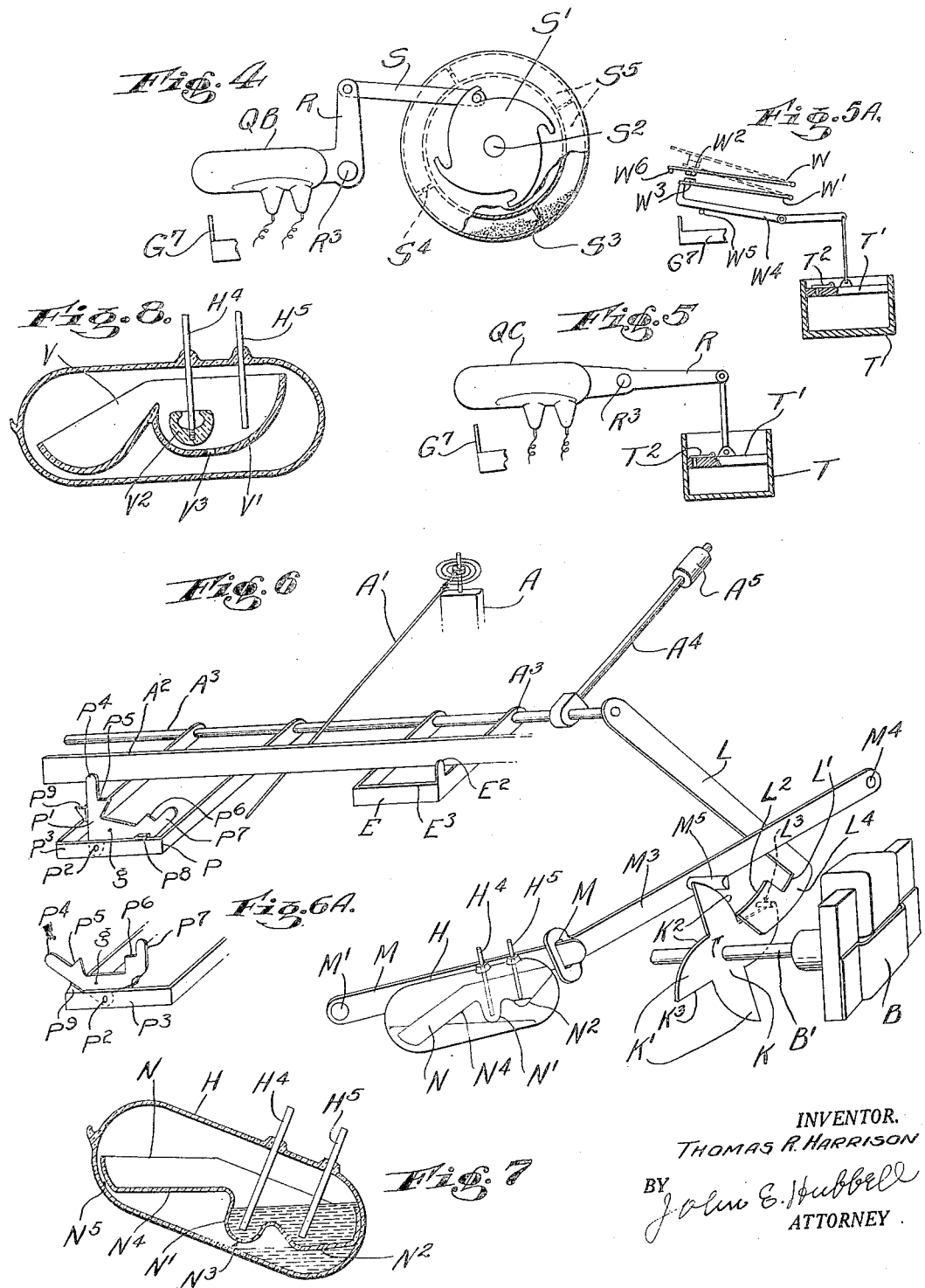

Patented July 4, 1933

1,916,420

UNITED STATES PATENT OFFICE

THOMAS R. HARRISON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA

CONTROL APPARATUS

Application filed November 2, 1929. Serial No. 404,280.

The present invention relates in general to automatic control apparatus, and particularly to safety mechanism incorporated therein and automatically operating to effect a control action when any of the other parts of the apparatus become inoperative, thereby preventing the device controlled from being subjected to abnormal operating conditions. The general object of my invention is to provide an improved form of operating mechanism for control apparatus characterized by the simplicity of the construction and mode of operation of the operating mechanism and its effectiveness under normal and abnormal conditions of operations. A further object of my invention is to provide an improved construction and mode of operation of a time lag switch of the liquid flow type.

My improved control apparatus is particularly adapted for use in automatic temperature control systems in which a control instrument periodically effects a control action in response to the E. M. F. value of a thermoelectric device or pyrometer exposed to the heat of the device controlled. When the temperature controlled is that of an electrically heated or fuel fired furnace, the control action may be made on the fuel supply provisions thereof as disclosed, for example, in the patent of Richard P. Brown, No. 1,489,920, granted April 8, 1924. In accordance with the present invention the furnace temperature is prevented from rising above a predetermined value on the occurrence of an abnormal operating condition, beyond which value overheating of the furnace structure or injury to the material heated may occur, by automatically effecting a control action to cut off the fuel supply to the furnace shortly after the occurrence of this condition. This abnormal condition will occur, for example, when any of the control instrument operating parts or the thermoelectric circuit become inoperative.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of the invention.

Of the drawings:

Fig. 1 is a perspective view representing somewhat diagrammatically a portion of a control system incorporating one embodiment of my invention;

Fig. 2 represents in perspective an alternative form of switch mechanism;

Figs. 3, 4, 5 and 5A are views similar to Fig. 2 of other forms of switch mechanism.

Fig. 6 is a view similar to Fig. 1 illustrating a modified form of control apparatus;

Fig. 6A illustrates the safety table of Fig. 6 in the starting position;

Fig. 7 illustrates the switch of Fig. 6 in a different position; and

Fig. 8 represents a modified form of switch.

In the drawings and particularly in Fig. 1, I have illustrated a portion of an automatic temperature control system in which the control instrument comprises a galvanometer coil element A carrying a pointer A′ swinging about the suspension axis of said element in accordance with the variations in value of the E. M. F. generated by a pyrometer $A^6$ exposed to the heat of a furnace (not shown) and connected to binding posts on the instrument by leads 1 and 2. $A^2$ indicates the instrument scale immediately below which the free end of the pointer swings.

The furnace temperature is regulated by the control instrument periodically effecting a control action on the fuel supply means of the furnace. The mechanism normally effecting this action comprises a shaft B′ slowly rotated in a clockwise direction by a time controlled electric motor B, such as a synchronous motor, and on which shaft an operating cam C is rigidly mounted. The cam C is formed with arcuate surface portions C′ and $C^2$ and a pair of diametrically opposite notched surface portions $C^3$ and $C^4$. A cam follower D, having its upper end secured to a horizontal shaft $A^3$, is positioned at one side of and adjacent to the cam C. The lower end of the follower is formed with a laterally projecting end D', which by the weight of the follower is maintained in contact with the adjacent cam surface.

With the foregoing arrangement the shaft A³ receives a pair of oscillations during each revolution of the cam. This shaft is arranged at the rear of the scale A² and carries a control table E positioned below the scale at a point corresponding to a desirable operating temperature. The table consists of a U-shaped member having its legs E' angularly fixed on, but slideable longitudinally of, the shaft A³. The base portion of the table has a straight contact edge E³ and a vertical finger E² for limiting movement of the pointer.

As shown in Fig. 1, while the follower end contacts with either of the arcuate cam surfaces the table is spaced a predetermined distance below the lower edge of the scale, and as the follower end D' moves inwardly in either cam notch, the table is moved in a clockwise direction until obstructed by the lower edge of the scale or by the pointer A' when the latter indicates a temperature value corresponding to the portion of the scale towards which the table is moving. The pointer would then limit the inward movement of the follower.

At the side of the cam C opposite the follower D is located a pendulum G secured to a rotatable shaft G⁴ and having an adjustable weight G' at its lower end. The upper end G² of the pendulum carries a laterally projecting stud G³ which is adapted to be engaged by the end of a bell crank lever F pivoted at F' when the pendulum is tilted from its free position. The lever is held in the locking position shown in Fig. 1 by a tension spring F⁴. The vertical portion of the lever has a lateral extension F² arranged adjacent a projecting contact edge D² formed on an intermediate portion of the follower D. The lever extension is arranged to be actuated thereby only when the follower is permitted to move inwardly to the full extent of the cam notch. The pendulum has a laterally inclined arm G⁵, at the upper end of which a follower pin G⁶ is mounted and arranged to contact with the periphery of the cam C at a point substantially diametrically opposite the contact point of the follower D. Therefore, when the follower D begins its inward movement into the notch C³, the pin G⁶ is about in a position permitting pendulum movement into the notch C⁴.

When the pointer A' is below the control table as shown in Fig. 1, the follower D can move inwardly to the full extent of the notch C³. During the latter portion of this movement the intermediate contact edge D² engages the lever F to move the latter out of engagement with the pendulum stud G³. The pin G⁶ being then in a position to permit clockwise movement of the pendulum, the latter on its release immediately swings outwardly causing the shaft G⁴ to be partly rotated. A tilting lever G⁷ mounted on the shaft G⁴ by an arm G⁹ is simultaneously raised to actuate a suitable safety switch as hereinafter described.

The fuel supply means of the furnace is preferably controlled through an operating circuit comprising conductors 3 and 4, the making and breaking of the circuit being effected by the above mentioned switch. In the construction shown in Fig. 1 the switch is of the liquid flow type having an elongated sealed glass envelope or tube H and formed at one end with a pair of depending chambers or leg portions H' and H². The terminals or electrodes H⁴ and H⁵ of the conductors 3 and 4 are mounted in the chambers H' and H², respectively, with the terminals sealed in the glass and extending to a point below the top of the corresponding chamber. The tube contains a predetermined amount of conducting liquid, such as mercury, which when in the terminal end of the tube is sufficient to overflow the chambers H' and H² and thus establish an electrical connection between the operating circuit terminals. The tube is mounted on a hinge shaft H³, which is shown as extending between the tube chambers.

The switch preferably comprises time lag provisions for maintaining the operating circuit closed for a predetermined interval after the switch actuating lever is no longer effective. In the switch illustrated in Fig. 1, the flow of mercury towards the free end of the tube is restricted by a transverse baffle H⁶ which is in fluid-tight contact with the walls of the tube and has its lower portion provided with an orifice H⁸ through which the mercury flows away from the terminal end of the tube as long as the mercury level therein is higher than the orifice.

The tube is also constructed to permit a substantially unobstructed flow of mercury towards the terminal end of the tube when the lever G⁷ is actuated. For this purpose the baffle H⁶ is vertically inclined towards the terminal end of the tube and its upper section cut away as indicated at H⁷. The mercury then flows over the upper edge of the baffle in an amount dependent on the rapidity of the tilting movement and the angle to which the tube is tilted.

With the parts constructed and arranged as described, the tube H will be tilted by the lever G⁷ every time the pendulum is released from its locked position. The pendulum can only be released when the pointer A' indicates a temperature below the desirable value. When so positioned and with the cam C rotating in a clockwise direction, the follower D will move inwardly into the notch C³ to its full extent, thereby actuating the bell crank lever F to release the pendulum G and raise the tube. The mercury in the free end of the tube H then flows over the baffle H⁶ into the terminal end of the tube to overflow the chambers H' and H² and close the operating circuit. The lever G⁷ drops out of contact with the tube on the return movement of the pendulum, at the end of which movement the pendulum is again locked in position by the cam. The tube returns to its normal position with the mercury slowly flowing through the orifice H⁸, as indicated in Fig. 1. The flow continues and after a predetermined interval, the operating circuit is broken.

The normal position of the tube is determined by the position of an adjusting screw H¹¹ mounted in a support H¹² and arranged to obstruct a lateral portion H¹⁰ of a tube extension member H⁹. This screw can therefore be adjusted to regulate the length of the contact making period. The rate of flow of the mercury towards the free end of the tube is desirably regulated to effect a contact making period about 50% greater than the interval between successive oscillations of the follower. For example, the interval between oscillations may be 15 seconds and the contact making interval approximately 22½ seconds. The cam C being continuously rotated, a similar control action is effected when the notch C⁴ reaches the follower D. If the pointer A' is still below the desirable operating temperature, the switch is again tilted and the operating circuit maintained closed. If, however, the pointer now indicates that the furnace has reached the desirable operating temperature, the upward movement of the control table will be obstructed by the pointer and the follower inward movement in the notch consequently insufficient to actuate the bell crank lever F. The pendulum G and tube H will then remain in the position shown in Fig. 1 and the terminal circuit will be broken approximately 7½ seconds after this ineffective control action. The switch thus operates to make the circuit under the action of an external force, maintains the circuit for a predetermined period after the external force is ineffective, and is self-opening at the end of that period.

In the event of one or more of the operating parts such as the motor B, becoming inoperative, it is extremely desirable to cut off the fuel supply means to prevent overheating of the furnace or injury to the fluid or material being treated. If the motor B becomes inoperative while the parts are in the position indicated in Fig. 1, then it will be apparent that no movement of the follower can occur and, since the pendulum remains locked, the tube will remain in the position indicated. The operating circuit will then be broken at the end of the contact making period then in effect.

If, however, the actuating circuit of the instrument should be broken due to any cause, such as a break in the pyrometer elements or leads, the pointer A' will immediately swing to the zero scale position. Thereafter, irrespective of the value of the furnace temperature the control mechanism would be periodically operated to continuously maintain the operating circuit since the pointer is out of the path of movement of the control table. The furnace temperature may then rise far above the desired value. To prevent the occurrence of this undesirable condition on the failure of the instrument circuit, I have provided additional mechanism for automatically effecting a control action which breaks the operating circuit. This mechanism comprises a safety table I mounted on the shaft A³ in the same manner as the control table. The safety table is also formed by a U-shaped member having supporting arms I', a pointer limiting finger I², and a horizontal contact edge I³. The tables E and I are preferably mounted on the shaft with the contact edges E³ and I³ at the same level. The safety table is arranged adjacent the zero scale marking. When the pointer swings to a position between the safety table and scale, movement of the follower D will be limited to a point insufficient to actuate the lever F. The operating circuit will thus be automatically broken at the end of the circuit contact making period.

Since the pointer is normally adjacent the zero marking on the scale when the furnace is cold, it is necessary to eliminate the normal control effect of the safety table to heat the furnace. To that end, I have provided mechanism for closing the full supply operating circuit at starting. Such mechanism as illustrated consists of a lever D⁶ secured on a rotatable shaft D⁷ and arranged to engage the outer end of a bar D⁴, which is pivoted at D⁵ on the cam follower D. The bar D⁴ is normally in the full line position shown in Fig. 1 under the action of gravity, further lower movement being prevented by a stop D³ on the follower. At starting the lever D⁶ is rotated into contact with the bar D⁴ to shift the latter to the dotted line position shown in Fig. 1, in which position the bar extends beyond the contact edge D². When the next periodic actuation of the follower occurs with the pointer obstructing the safety table, the bar D⁴ engages and moves the bell crank lever to effect the release of the pendulum and a consequent closing of the operating circuit.

As the furnace temperature rises the pointer A' will pass beyond the range of action of the safety table and the follower can then swing inwardly to its full extent. The follower movement carries the arm D⁴ beyond the end of the starting arm D⁶ and the arm D⁴ returns to its normal position. The control apparatus performs its usual control operations to maintain the operating circuit closed until either the desirable temperature is reached or the operating parts or instrument circuit rendered ineffective. It will be noted that the pendulum arrangement insures a positive tilting movement of the switch, regardless of what may effect the other operating parts after its release.

In Fig. 6 I have illustrated a modified form of control apparatus in which the operating parts have the same general construction and mode of operation as those illustrated in Fig. 1, distinguishing however in the specific construction and effectiveness of the safety provisions and by automatic operation of the furnace starting provisions. In this construction the control table is identical in construction and mode of operation of the control table E of Fig. 1. The motor B rotates a cam K which, as shown, is provided with four projecting arms $K'$, each of which is formed with a straight edge portion $K^3$ and a curved edge portion $K^2$. A cam follower L, secured on the shaft $A^3$ is provided with a projecting lower portion $L^4$ having its upper edge formed by high and low steps $L^2$ and $L'$, respectively. A pin $L^3$ projects laterally therefrom to engage the adjacent cam surface and is held in contact therewith by a counter-weight $A^5$ on a shaft rod $A^4$.

The switch mechanism in this construction comprises a mercury tube H fixed on a lever M, one end of which is pivotally connected at $M'$ to a suitable support. The opposite end of the lever is mounted in a slot $M^2$ at one end of a second lever $M^3$, extending transversely thereto and having its opposite end pivoted at $M^4$. A stud $M^5$ projects laterally from the lever $M^3$ into contact with one of the cam surfaces. The tube in this construction, as shown in Figs. 6 and 7, contains a longitudinally extending baffle or scoop N of insulating material and formed with an inclined section $N^4$ leading to a reservoir $N'$ into which the terminal $H^4$ extends. A second reservoir $N^2$ of lesser capacity is provided for the terminal $H^5$ and the portion of the scoop between the reservoirs made sufficiently low to permit the mercury to bridge the terminals and close the circuit while only a portion of the mercury in the tube is in the reservoir section. The reservoir $N'$ is connected by a drain opening $N^3$ with the portion of the tube below the scoop and through which opening the mercury flows while the reservoir liquid level is higher than that in the bottom of the tube. The opposite end of the scoop is spaced from the corresponding tube end to provide a liquid passage $N^5$.

With the foregoing parts arranged as described, the control cycle which in normal operation periodically occurs consists in raising the tube H to the position shown in Fig. 6 under the action of one of the cam surfaces $K^2$, in which position substantially all the mercury in the tube collects in the lower end. While the stud $M^5$ is being raised, the follower pin $L^3$ moves inwardly on the corresponding cam surface $K^3$ to an extent dependent on whether or not the pointer $A'$ is in a position to obstruct the edge of the control table. If the table is not obstructed, the follower L moves inwardly on the cam to a point at which the stud $M^5$ will slide down into contact with the low step $L'$ of the follower after the stud has passed over the upper end of the cam surface $K^2$.

This operation causes the switch tube to be moved to the position indicated in Fig. 7. The tilting movement causes the mercury in the lower end of the scoop to flow over the surface $N^4$ into the terminal reservoirs $N'$ and $N^2$, the mercury level therein then being sufficient to close the circuit between the operating terminals. The mercury in the reservoirs drains through the opening $N^3$ while the tube is returned by the cam to the position shown in Fig. 6. The pointer continuing in a position below the control table, the foregoing cycle of operations will be periodically repeated, the duration of the cycle being proportionally less than the time required for the mercury to drain sufficiently to break the operating circuit.

If, however, the pointer $A'$ is in a position to obstruct the control table, the follower L is prevented from moving to its full extent. In that case the follower high step $L^2$ is in a position to receive and prevent the stud $M^5$ from dropping sufficiently from its raised position to tilt the tube and replenish the mercury in the reservoirs. The draining of the mercury in the reservoir $N'$ continues with a subsequent breaking of the operating circuit.

If the switch actuating mechanism becomes ineffective while the switch is in any of its normal operating positions, the operating circuit will be automatically opened by the self-draining construction of the switch. This self-opening operation of the switch is effective in the extreme positions of the switch, as indicated, for example, in Fig. 7.

In the present form, the mechanism for automatically preventing actuation of the switch tube when the galvanometer circuit is broken comprises a safety table P consisting of a plate member $P'$ pivotally connected at $P^2$ on the outer end of a U-shaped supporting member $P^3$ which is rigidly connected to the shaft $A^3$ in the same manner as the table E. The plate member $P'$ has a normally vertical section terminating in a pointer limiting finger $P^4$ projecting above a horizontal contact edge $P^5$, which is preferably at the same level as the contact edge $E^3$ of the control table. The plate $P'$ also has a horizontal section which terminates in a straight edge $P^6$ and a finger $P^7$ perpendicular thereto. As shown in Fig. 6, the plate is normally in a position in which the center of gravity indicated at g is at the right hand side of the pivot point P², further angular movement of the plate in that direction being prevented by a stop P⁸ on the horizontal section engaging the member P³.

When so arranged, the pointer will be engaged by the finger P⁴ and by contact edge P⁵ as the member P³ is periodically raised. Since the edge P⁵ is at the same level as the control table, a corresponding control action will be effected to limit the movement of the follower and thus prevent the actuation of the switch. The distribution of the weight of the plate member prevents any angular movement when the pointer obstructs the edge P⁵.

When the furnace is to be started into operation, it is necessary to render the safety table ineffective to prevent the closing of the operating circuit. The plate P′ is therefore turned to the position indicated in Fig. 6A, in which position a stop P⁹ on the vertical section engages the supporting member P³, the center of gravity moving to the position indicated. In this position the pointer A′ will have no obstructing action and a corresponding contact making control action is performed. The furnace temperature increasing, the pointer will move towards the high temperature scale end, and in the course of that movement will engage the finger P⁷ and contact edge P⁶ to reset the plate in its normal position. The furnace temperature increasing, the pointer moves out of the operating range of the safety table and the switch actuating and non-actuating control actions heretofore described may take place as conditions require. The safety table construction described is advantageous in that the operating circuit will be maintained closed during starting without attention from the operator and because the table is automatically returned to its normal position when the furnace temperature rises.

In Figs. 2, 3, 4, 5 and 5A I have illustrated other forms of self-opening switches for opening the operating circuit after the switch actuating means has become ineffective. In Fig. 2, for example, a flow type tube switch is shown in which the tube Q is of a standard form which does not incorporate the time lag provisions previously described. The time lag action is secured herein by mounting an auxiliary mercury tube Q′ on the same shaft Q² and providing the auxiliary tube with a baffle Q³ similar in form to that of Fig. 1. In this construction the pair of tubes are simultaneously tilted by the tilting lever G⁷ and the restricted flow of the mercury through the baffle orifice Q⁴ in the tube Q′ is sufficient to delay the return of the tubes to their normal position and thereby retard the flow of mercury in the tube Q away from the terminals H⁴ and H⁵ sufficiently to maintain the operating circuit closed for a predetermined period.

In Fig. 3 a similar action is effected by pivotally mounting a tube QA on a shaft R³ carrying a ratchet R². The tube has an extension R carrying a pawl R′ pivotally connected thereto and arranged to engage successive ratchet teeth as the tube is tilting about its pivot by the lever G⁷. If, for example, the pawl is advanced one tooth before the lever G⁷ drops, the ratchet will be rotated as indicated by the weight of the tube and cause a fan R⁴ to turn. The air resistance to the fan blades impedes the movement of the ratchet and consequently delays the return of the tube to its normal position.

The switch mechanism of Fig. 4 operates on substantially the same principle as that of Fig. 3, the tilting of the switch tube QB advancing a pawl member S on a ratchet S′. The resultant rotation of the ratchet and the shaft S² is retarded by the movement of a liquid or granular material through orifices S³ in the diaphragms S⁴, which divide an annular chamber mounted on the ratchet shaft into a plurality of arcuate sections S⁵.

In Fig. 5 the tube QC on being tilted about its pivot axis R³ moves the extension R to depress the piston T′ in a dash pot T. The subsequent upward movement of the piston will be impeded by the pressure on the piston and the closing of the one-way valve T².

In Fig. 5A, a spring contact construction comprising a pair of flat springs W and W′ carrying contacts W² and W³, respectively and actuated through a pivoted lever W⁴ is substituted for the tube element of the switch mechanism of Fig. 5. The lever W⁴ is connected to the dash pot piston with its opposite end supported on a stop W⁵. The adjacent end of the lever contacts with the spring W′, which is normally spaced from the spring W by a stop W⁶ contact with the latter. In operation, the lever G⁷ tilts the contact lever W⁴ about its pivot, bringing the spring contacts into engagement. The springs are moved to the dotted line position by the lever W⁴ and the return movement retarded by the dash pot action.

In Fig. 8 a modified form of switch tube is shown incorporating the general construction of the tube of Figs. 6 and 7, except that the scoop V is formed with a single reservoir V′ and the terminal H⁴ carries a cup V² of arc resisting material such as fused quartz or porcelain at its lower end, whereby the break in the terminal circuit will advantageously occur at the upper edge of the porcelain cup rather than on a glass edge such as is intermediate the reservoirs of Fig. 7. A drain hole V³ is also provided and the tube is actuated as before to effect the various control actions. It will be understood that the switch tube in this and the other constructions can be advantageously filled with a spark quenching and heat conducting medium such as hydrogen.

While in accordance with the provisions of the statutes, I have illustrated and described the best forms of embodiment of my invention now known to me, it will be apparent to those skilled in the art that changes may be made in the form and arrangement of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. Automatic control apparatus comprising in combination an element moving in response to changes in value of a condition of the device controlled, a switch for controlling an operating circuit, mechanism for periodically actuating said switch to effect a circuit making or breaking control action depending on the position of said element, and means for maintaining said circuit closed for a definite period after said switch actuating mechanism becomes ineffective.

2. Automatic control apparatus comprising in combination an element moving in response to changes in value of a condition of the device controlled, a switch for controlling an operating circuit, mechanism for periodically actuating said switch to effect a circuit making or breaking control action depending on the position of said element, said mechanism comprising a normally restrained pendulum member, and means for maintaining said circuit for a definite period after said switch actuating mechanism becomes ineffective.

3. Automatic control apparatus comprising an element moving in response to changes in value of a condition of a controlled device, mechanism operating in conjunction with said moving element comprising a periodically oscillating member, a control table actuated by said oscillating member, the extent of movement of said control table and oscillating member being dependent on the position of said moving element, a self opening liquid flow type switch, and means rendered operative by said oscillating member when said condition is below a predetermined value to close said switch and rendered inoperative when said condition is at said predetermined value, said switch opening automatically and independently of said means when the latter is rendered inoperative.

4. Automatic temperature control apparatus comprising a member moving in response to temperature changes in a controlled device, mechanism operating in conjunction with said member comprising a periodically actuated control table, the extent of movement of said control table being dependent on the position of said member, a self-opening switch for controlling an operating circuit, and means for actuating said switch to close said circuit, said last mentioned means being rendered operative or inoperative depending on the effect of said member on said control table, said switch opening automatically and independently of said means when the latter is rendered inoperative.

5. Automatic temperature control apparatus comprising a pointer deflecting in response to temperature changes in a controlled device, mechanism operating in conjunction with said pointer comprising a continuously rotating cam, a control table oscillated by said cam, the extent of oscillatory movement of said control table being dependent on the position of said pointer, a liquid flow type self opening switch for controlling an operating circuit and operable to close said operating circuit, and means for actuating said switch rendered operative or inoperative depending on the effect of said pointer on said control table, said switch opening automatically and independently of said means when the latter is rendered inoperative.

6. In a control system, the combination with a control instrument having an element moving in response to changes in value of a condition of a controlled device, of mechanism including a member periodically moved into engagement with said element for effecting control actions on said device in accordance with the position of said element, safety means operable on a predetermined movement of said element, means including a manually adjustable part mounted on said member for rendering said safety means ineffective under starting conditions, and means for automatically rendering said safety means effective after a predetermined change in position of said element.

7. Automatic control apparatus comprising in combination, a deflecting meter pointer, an oscillating member having two spaced apart pointer engaging portions, means for effecting periodical oscillating movements of said member the extent of each such movement in one direction being greater or less accordingly as the pointer is or is not then in position to be engaged by one or the other of the two portions and control mechanism selectively dependent on said extent of movement, and similarly affected by the engagement of either of said portions with said pointer.

8. In a control instrument, in combination, a deflecting meter element, an oscillating member having a pointer engaging part adapted to engage the pointer when the latter is in a position corresponding to a high value of the quantity measured and a second pointer engaging part adapted to engage the pointer when the latter is in a position corresponding to a zero value of the quantity measured, means for giving said member periodical oscillating movements each such movement in one direction being of a predetermined extent or of a greater extent accordingly as the pointer is or is not in position to be engaged by one or the other of said parts and control mechanism subjected to different control effects accordingly as said movement is of one or the other extent.

9. Automatic control apparatus comprising in combination a deflecting meter pointer, an oscillating member comprising two pointer engaging portions so spaced apart that one may engage the pointer when the latter is in a position corresponding to a high value of the quantity measured and the other may engage the pointer when the latter is in a position corresponding to a low value of the quantity measured, means for giving said member periodical oscillating movements, the extent of each such movement in one direction being greater or less accordingly as said movement is or is not limited by the engagement of one of said portions with said pointer and mechanism subject to selective control actions dependent upon said extent of movement, the said control actions to which said mechanism is subjected when either of said portions engages said pointer being the same.

10. In a control instrument, the combination with a control element adjusted into one condition when subjected to an actuating impulse and tending after each impulse to adjust itself into a second condition in a predetermined time interval, a deflecting meter element and means selectively controlled by the position of said meter element and operating while said element is in one position to subject said control element to actuating impulses repeated with such frequency that the time interval between successive impulses is less than the first mentioned time interval whereby said control element is then maintained in its said one condition, but assumes its second condition whenever said means fails to so repeat said impulses.

11. Automatic control apparatus comprising in combination a control switch comprising an adjustable container, conductor terminals extending into said container, a body of conducting liquid in said container which is moved into a position therein in which it connects said terminals when said container is subjected to an adjusting impulse and which is moved by a retarded gravital action into a second position in which it does not connect said terminals after a definite time interval following each adjusting impulse, a movable control element, and mechanism selectively controlled by the position of said element and operating while said element is in one position to subject said container to adjusting impulses repeated with such frequency that the time interval between successive impulses is less than the first mentioned interval whereby said conducting liquid is then maintained in the position to connect said terminals but moves to disconnect said terminals whenever said impulses are not so repeated.

12. In a control system, the combination with a control instrument having an element moving in response to changes in value of a condition of a controlled device, of mechanism for effecting control actions on said device in accordance with the position of said element including safety means comprising a member periodically moved into engagement with said element and a manually adjustable part mounted on said member for rendering said safety means ineffective under starting conditions and means for automatically rendering said safety means effective after a predetermined change in position of said element.

Signed at Philadelphia, in the county of Philadelphia and State of Pennsylvania, this 31st day of October, A. D. 1929.

THOMAS R. HARRISON.